Patented Oct. 13, 1936

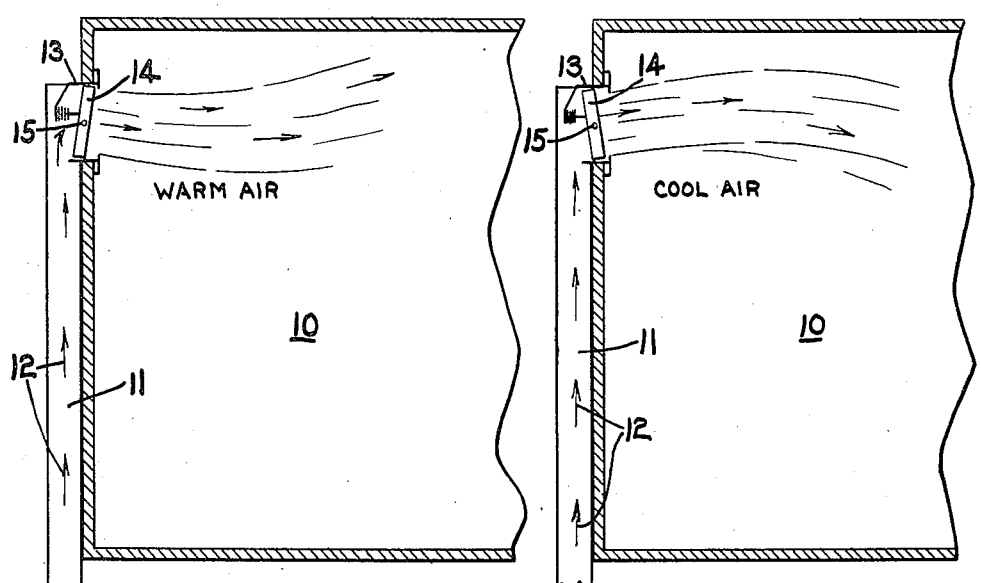
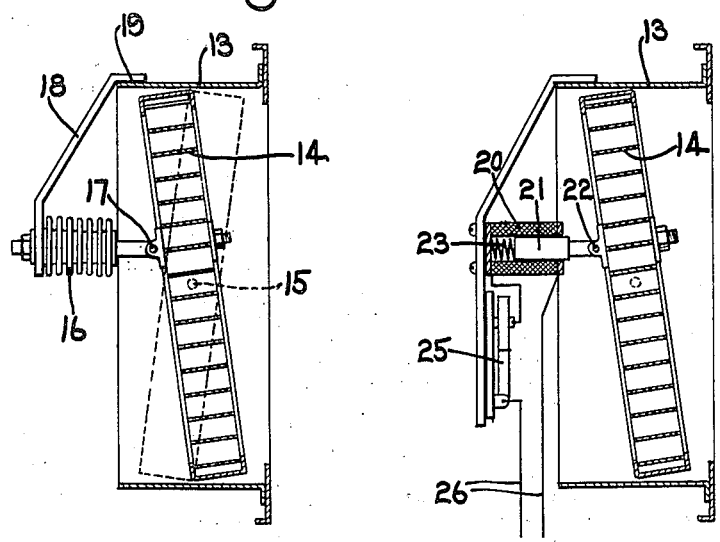

2,057,494

UNITED STATES PATENT OFFICE 2,057,494

ADJUSTABLE DIRECTIONAL GRILLE

Robert L. Leigh, Holland, Mich., assignor to Hart & Cooley Manufacturing Company, Dover, Del., a corporation of Delaware Application May 18, 1936, Serial No. 80,399

5 Claims. (Cl. 98—108)

This invention relates generally to a plenum heating system and more particularly to a movable register which is automatically movable so as to directionally project the air whereby optimum conditions will prevail.

It is becoming prevalent to use air conditioning systems for both heating and cooling and the primary object of this invention is to provide a register which can be automatically moved to direct the air in a predetermined direction, this direction being controlled by the temperature of the entering and conditioned air.

Explaining another way, better results are secured in heating if the air is directed downwardly from a register positioned relatively high in the room while the cool air, used to cool the room, as in summer, would be directed upwardly from the register.

In the drawing:

Fig. 1 is a diagrammatic view in vertical cross section of a room illustrating the entry of warm air through my improved mechanism.

Fig. 2 is a similar view illustrating the entry of cooler air.

Fig. 3 is an enlarged view of the register or grille in vertical cross section.

Fig. 4 is a vertical cross sectional view through a modification of my device.

Similar numerals refer to similar parts throughout the several views.

As shown in Fig. 1, numeral 10 indicates the room or space to be conditioned by means of the air ascending through the vertical conduit 11 as indicated by arrows 12.

The conduit 11 carries the air upwardly and then the air passes through the grille 14 mounted in the frame 13.

As is shown in Fig. 3, the grille 14 is pivotally mounted at 15 and a thermostatic element 16 is pivoted at 17 thereto. The thermostatic element 16 is carried by a bracket member 18 which is fastened at 19 onto the frame 13.

The operation of the mechanism just described will be easily understood. During passage of warm air the thermostatic element 16 causes forward tilting of the grille 14, as shown in dotted lines in Fig. 3, and thus the air will enter the room in a downward direction as shown in Fig. 1 of the drawing.

Whenever cool air flows upwardly through the conduit 11, it contacts the thermostatic element 16 and causes rearward tilting of the grille 14 as shown in full lines in Fig. 3. The cool air travels in the path illustrated by the arrows in Fig. 2.

Fig. 4 discloses an electrical mechanism consisting of a solenoid 20, encircling a plunger 21 which is pivoted at 22 onto the grille 14. A spring 23 normally urges the plunger outwardly. Numeral 25 indicates a thermostatic mechanism which varies the electrical energy supplied to the solenoid 20 by the conductors 26 and causes proportional movement of the plunger 21 whereby the grille 14 is rearwardly tilted as shown in Fig. 4, whenever relatively cool air passes into the room and is tilted forwardly whenever relatively warm air passes into the room.

It will be understood from an inspection of Figs. 1 and 2 that the warm air, this tending to rise, is projected more or less angularly downwardly, while the cool air, this tending to sink, is projected slightly upwardly. Thus a uniform stratified air condition is approached throughout the room.

Having thus revealed this invention, I claim as new and desire to secure the following combinations and elements, or equivalents thereof, by Letters Patent of the United States.

I claim:

1. The combination with an air duct of variable directional means at the outlet thereof comprising, a movable member acting upon the air current emitted from said duct and directing said current in different directions in the different positions to which it is moved and automatic means acting to move said movable member, said automatic means being controlled by the temperature of the air current passing through the duct.

2. The elements in combination defined in claim 1 in which said automatic means is controlled to move said movable member to a position to direct the air current in a downward direction when said air current is at a relatively high temperature and to move said movable member to direct the air current at an upward angle when the air current is at a relatively low temperature.

3. The combination with an air duct of a movable member at the outlet thereof acting upon the air current emitted from the duct and variously directing the air current passing from the duct and a thermostatic member connected to move said movable member, said thermostatic member being exposed to the air passing through and out of said duct and being actuated to move said movable member by changes of temperature of said air current.

4. The elements in combination defined in claim 3 in which said thermostatic member moves the movable member to direct the air current in a downward direction when the temperature of the air current is relatively warm and acts to move the air current in an upward direction when the temperature of the air current is relatively cool.

5. The elements defined in claim 3 in which said thermostatic member is located within said duct.

ROBERT L. LEIGH.